Aug. 21, 1934.  C. H. BARTON  1,970,795
LOCK-OUT COLLAR CONTROL FOR FREEWHEEL UNITS
Filed June 22, 1931  3 Sheets-Sheet 1
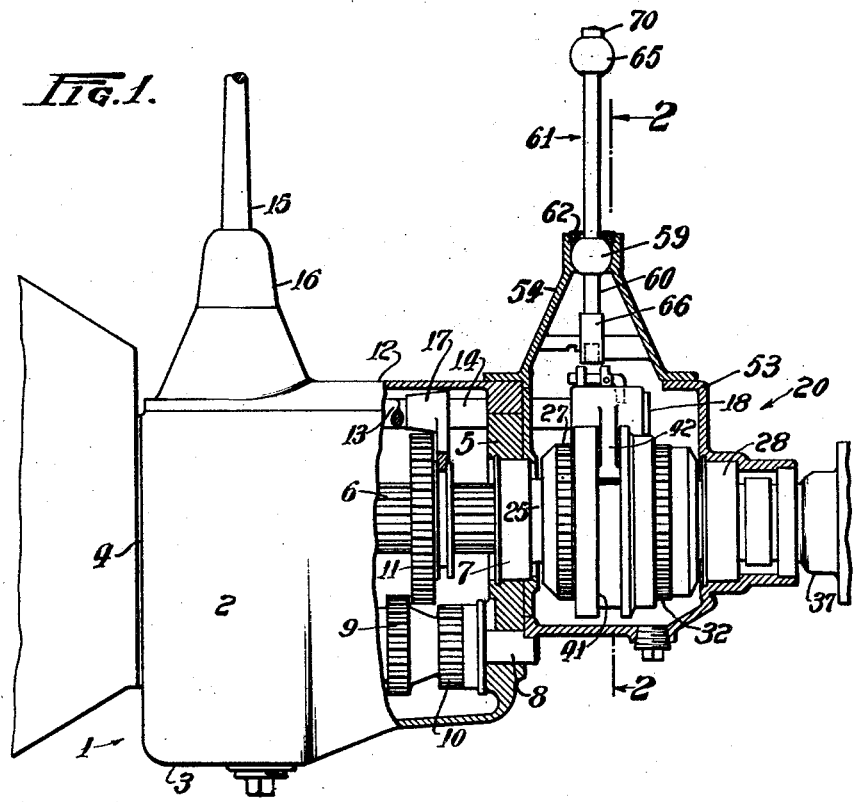
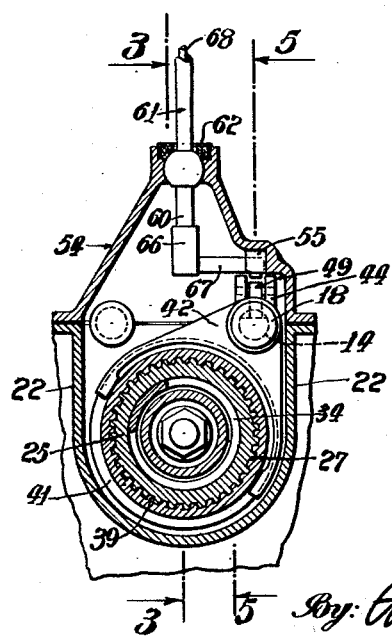
Inventor:
Clarence H. Barton Aug. 21, 1934.  C. H. BARTON  1,970,795
LOCK-OUT COLLAR CONTROL FOR FREEWHEEL UNITS
Filed June 22, 1931  3 Sheets-Sheet 2
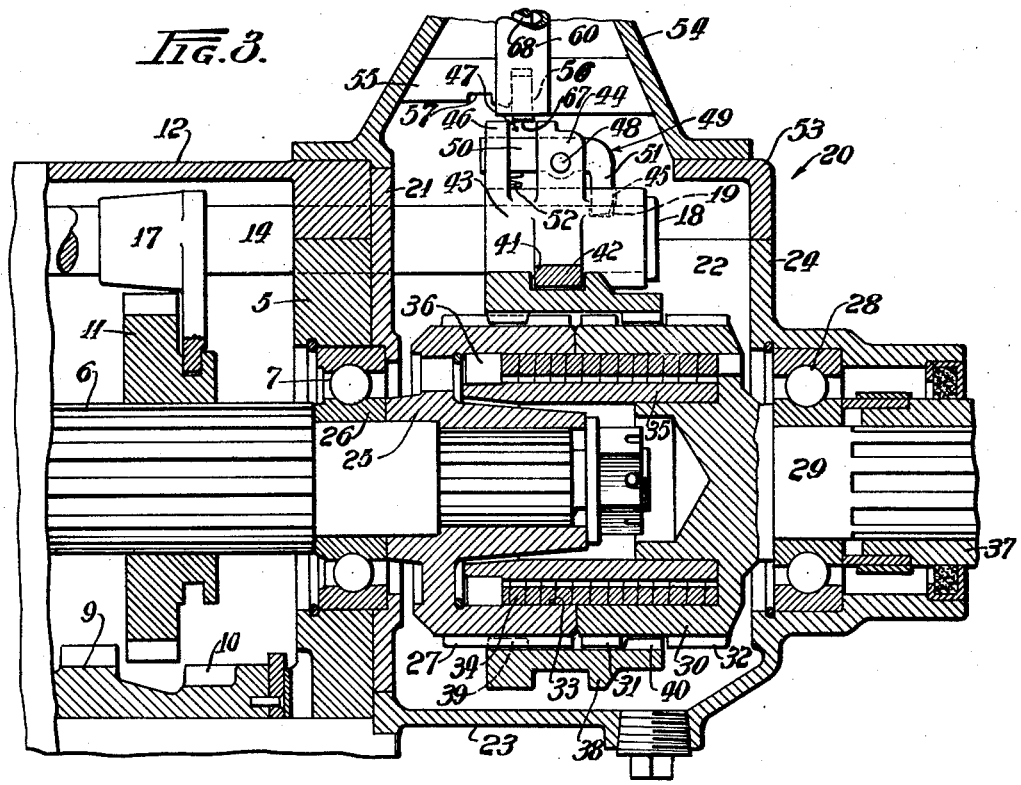
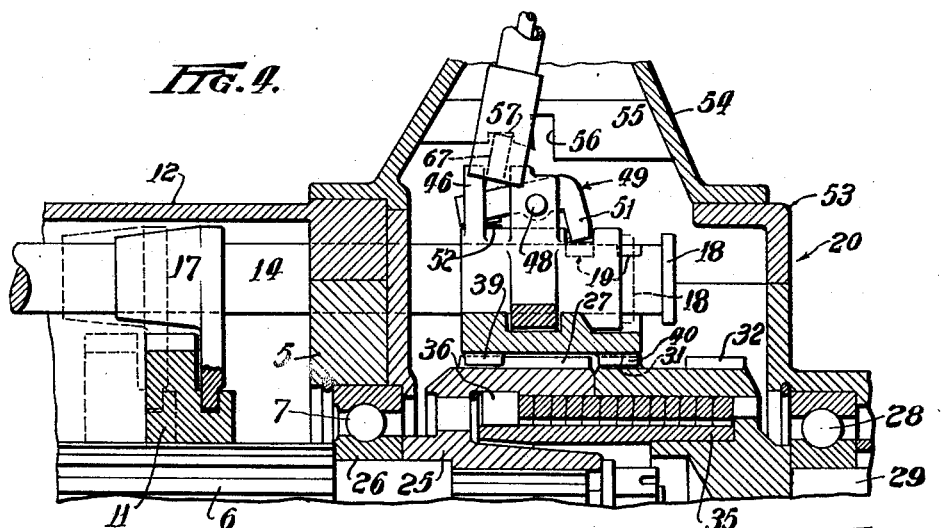
Inventor:
Clarence H. Barton
By: Arthur W. Nelson
Att'y.

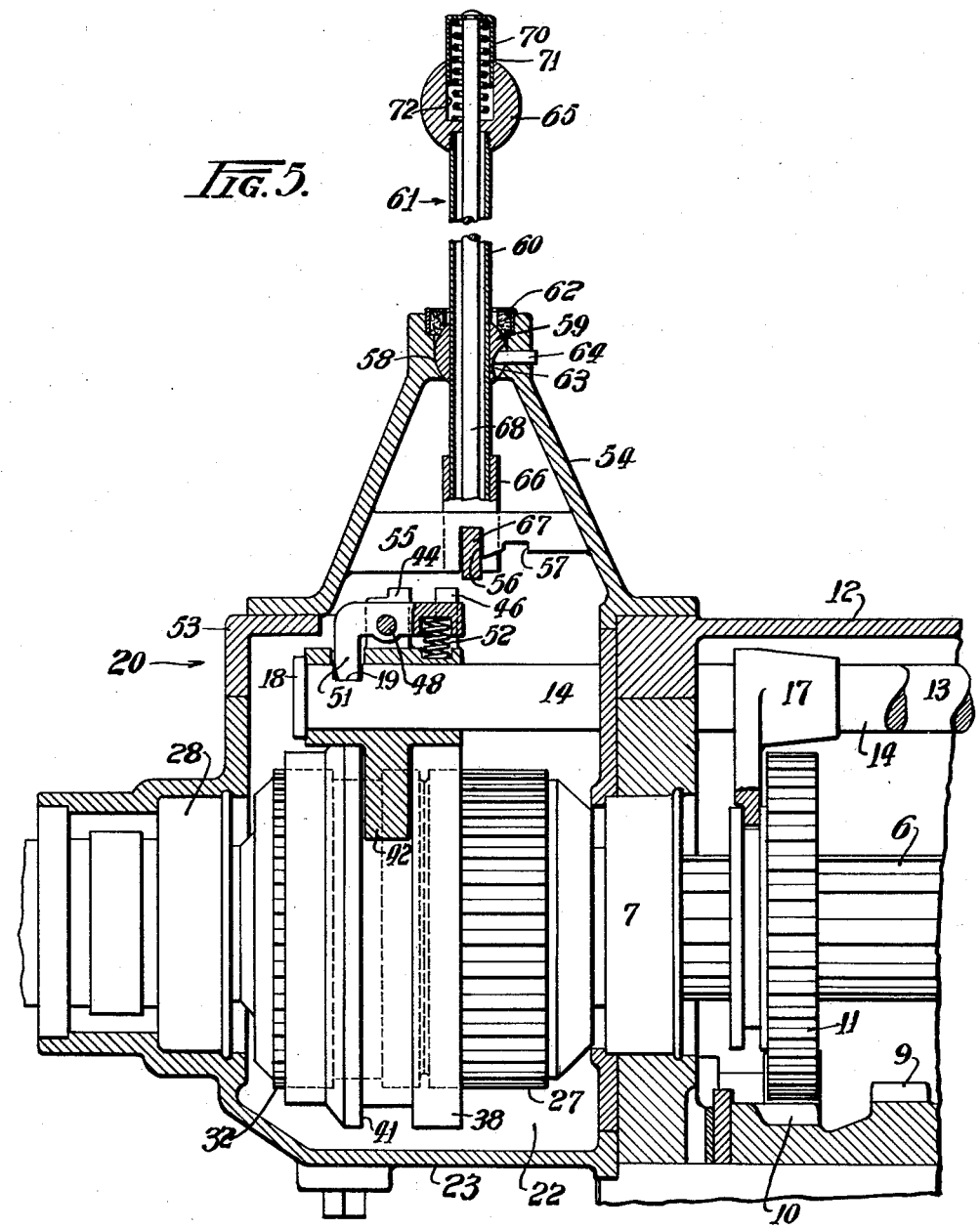

Patented Aug. 21, 1934

1,970,795

UNITED STATES PATENT OFFICE 1,970,795

LOCK-OUT COLLAR CONTROL FOR FREEWHEEL UNITS

Clarence H. Barton, Indianapolis, Ind., assignor to L. G. S. Devices Corporation, Indianapolis, Ind., a corporation of Indiana Application June 22, 1931, Serial No. 545,890

15 Claims. (Cl. 74—343)

This invention relates to improvements in lock-out collar control for free wheel units and it consists of the matters hereinafter described and more particularly pointed out in the appended claims.

The improved mechanism is of especial advantage in automobiles wherein there is associated with the change speed transmission thereof, a unit which under certain conditions permits the propeller shaft to overrun the driven shaft of the transmission.

The primary object of the invention is to provide an improved means for controlling the lock-out collar of such a unit, whereby said collar is automatically shifted to a lock-out position when going into either low (or first) speed forward or into reverse when the associated shift rail or rod has thus been actuated and which collar may also be locked-out when desired in any other forward speed by means independent of said shift rail or rod movement.

Another object of the invention is to provide a mechanism of this kind which is so arranged that it is impossible to manually shift the lock-out collar when in first speed forward to provide free wheeling, so that the free wheeling mechanism is safeguarded against use as a driving connection in low gear, and this permits the use of a smaller unit than would be required for transmitting low gear torque.

These objects of the invention, as well as others, together with the many advantages thereof, will more fully appear as I proceed with my specification.

In the drawings:—

Fig. 1 is a view in side elevation of a conventional type of automotive change speed transmission having a free wheeling unit in which is included a lock-out collar control embodying my invention, a part of the casing of both the transmission and unit being broken away to more clearly show the construction thereof.

Fig. 2 is a transverse vertical section through the free wheeling unit of Fig. 1 as taken on the line 2—2 of said Fig. 1.

Fig. 3 is a longitudinal vertical sectional view through the same on an enlarged scale as taken on the line 3—3 of Fig. 2, with the parts in the position they assume when the first and reverse shift rail or rod is in the neutral position.

Fig. 4 is a fragmentary view of parts shown in Fig. 3 after the lock-out collar of the unit has been manually shifted to lock-out the free wheeling unit when the transmission is set to produce speeds forward other than first speed forward.

Fig. 5 is another longitudinal vertical section through the free wheeling unit as taken on the line 5—5 of Fig. 2 and illustrates the collar as being shifted to lock-out condition upon a rearward movement of the shift rail of the transmission to provide a reverse drive.

In general, the transmission is of the conventional type providing three speeds forward and one reverse, such as are employed to a large extent in the present day automobile.

In such a transmission are embodied the two shift rails or rods either of which may be selected in the manipulation of the transmission shift lever to provide in one instance first (or low) speed forward and also reverse, the other rail or rod providing second or third (or high) speed forward. Associated with the transmission is a mechanism which under certain conditions provides an overrunning of the propeller shaft with respect to the driven shaft of the transmission and which mechanism is generally known as a "free wheeling" mechanism.

In some instances such mechanisms are embodied directly in the transmission and in another instance such mechanisms are embodied in a separate unit outside and to the rear of the transmission and the improved lock-out collar control embodying my invention is especially adapted for use in connection with the last mentioned type of unit.

Such a unit includes a casing bolted on to the rear end of the transmission casing and one end of the driven shaft of the transmission extends into said casing and is there provided with a cup like clutch member that is splined exteriorly. Axially aligned with said driven shaft and journalled in the casing is a secondary shaft adapted for operative connection at its rear end with the associated propeller shaft, the other end of said secondary shaft has an exteriorly splined cup like clutch member secured thereto and which coacts with the first mentioned clutch member to form a pocket in which a clutch spring is located. Associated with both clutch members is an internally splined ring, which can be shifted to positively connect the clutch members together independent of the spring when so desired. That rail of the transmission which provides first speed forward or reverse, has one end disposed in said casing and said rail end can be connected to and disconnected from said collar through a manually operable lever, as will more fully appear later.

Referring now in detail to that embodiment of the invention illustrated in the accompanying drawings, 1 indicates as a whole the open top casing of a conventional automobile change speed transmission having side walls 2, a bottom wall 3, a front end wall 4 and a rear end wall 5. 6 indicates the splined driven shaft of the transmission which is journalled in an antifriction bearing 7 in the rear end wall of the transmission. 8 indicates the jack shaft of the transmission and which is suitably journalled in the end walls of the casing 1 and is provided with the usual gears, only the gears 9 and 10 providing first (or low) speed forward and reverse being shown herein.

On the driven shaft 6 of the transmission is shiftably mounted a gear 11, which may be engaged with either the gear 9 or an idler pinion (not shown) which meshes with the gear 10 in the manner well-known. Other gears (not shown) are disposed in the transmission casing to provide the second and third speeds forward in the manner well known. In this instance, it is pointed out that when the gear 11 is shifted rearwardly on the shaft 6 it engages with the said idler pinion in constant mesh with the gear 10 on the jack shaft.

The open top of the casing is provided with a cover 12 in which shift rails or rods 13 and 14 are disposed for the usual movement which may be imparted thereto through a shift lever 15. Said lever is mounted for universal movement in an upright conical housing 16 on the front end of the cover. The rod 14 in this instance carries a yoke 17 so operatively engaged with the gear 11 as to shift said gear in accordance with the shift of the rod 14, it being understood that the shift rod 13 has a similar yoke for the selection of the second and third speed forward gear ratios. The rear end of the shift rod 14 extends through and a considerable distance beyond the rear wall of the casing and a collar 18 is secured to the extremity thereof. A short distance in advance of this collar, a notch 19 is formed in the top side of said shift rail end.

The transmission above described may be taken as illustrative of any conventional type of automobile change speed transmission to which, a free wheel unit embodying my improved lockout collar control may be readily applied. As shown herein said unit includes an open top and rear end casing 20, comprising a front wall 21, side walls 22—22, a bottom wall 23 and a rear wall 24, the front wall of the free wheel unit casing being bolted to the rear wall 5 of the transmission casing in any suitable manner.

The rear end of the shaft 6 is disposed in the casing 20 and has splined thereto a rearwardly facing cup like clutch member 25, the latter having a forwardly extending hub 26 which abuts against the bearing 7 that operatively supports the associated end of the shaft 6. The cup like member 25 has external splines or teeth 27 that extend substantially the full length thereof. In the rear wall 24 of the casing 20 is mounted n antifriction bearing 28 in which is journalled the mid portion of a secondary or auxiliary driven shaft 29. The front end of said secondary shaft 29 within the casing 20 is formed to provide a forwardly facing cup like clutch member 30 that has longitudinally spaced sets of external splines or teeth 31—32. These cup like clutch members 25—30 meet end to end whereby their splines or teeth match up with each other. Said members also coact to define a pocket 33 for a clutch spring 34, one end of which is anchored with respect to the clutch member 30. This clutch member carries a fixed tubular extension 35 of a diameter less but of a length greater than that of the clutch member itself and bearing rollers 36 are disposed between the front end of this sleeve and the clutch member 25.

The spring 34 is of such a character that when the clutch member 25 rotates relatively to the clutch member 30 in one direction, it will radially expand to grip against the internal cylindrical surface of the pocket 33 and clutch said members together. When the clutch member 30 rotates relatively to the clutch member 25 in the proper direction, the spring is contracted radially so as to release its gripping action on the said internal cylindrical surface of the pocket 33 so that the member 30 overruns the member 25. The rear end of the shaft 29 carries the usual flange member by means of which said shaft is operatively connected up with the associated propeller shaft, only the hub 37 of said member being herein shown.

Associated with and surrounding the meeting ends of the clutch members 25—30 is a collar 38, having internal splines or teeth 39 and 40 at its ends. Midway between its ends, said collar has an annular external groove 41 to receive the arms 42 of a yoke. This yoke includes a tubular boss or body 43 associated with and longitudinally shiftable under certain conditions, upon and with respect to the shouldered end of the shift rail or rod 14 before mentioned.

The boss or body 43 is provided on its top side about midway between its ends with a pair of laterally spaced, upstanding ears 44. To the rear of said ears, in said body is an opening 45 and forwardly of said ears is a pair of upright guide studs 46. The open space between said ears and studs thus provides an open top gap or recess 47. The ears 44 carry a cross pin 48 upon which and between said ears, an L-shaped trigger 49 is rockably mounted. The horizontal front end 50 of this trigger crosses the gap 47 and extends between the studs 46 for guided engagement while the vertical rear end 51 of said trigger is under certain conditions, adapted to extend down through the opening 45 in said yoke body to enter into the notch 19 in the shift rod 14. A spring 52 is interposed between the horizontal end of said trigger and the body of the yoke and which spring normally urges said trigger end upwardly.

The open top end of the free wheel unit casing 20 is closed by a cover 53 that includes an upright, hollow conical housing 54 and within the bottom end of said housing 54 there is provided a longitudinally extending bridge bar 55. In said bar are downwardly opening notches 56—57, the former one being the deeper. The top end of the housing is made to provide a seat 58 for a spherical enlargement 59 on the tubular body 60 of a collar shifting lever 61. A packing 62, holds the spherical enlargement upon its seat and in one side of said enlargement is provided a recess 63 into which a pin 64 fixed in the associated part of the housing 54 extends. This pin and recess limits the rocking movement of the lever to one direction only and which direction is parallel with that of the bridge bar 55.

On the top end of the lever tube 60 is provided a spherical or ball handle 65. Slidable on the bottom end of said lever tube is a sleeve 66 which carries a laterally extending finger 67 that overhangs the plane of the shift rod 14 and the yoke body 43 and associated parts thereon. Within said lever tube and secured at its bottom end to the sleeve 66 is an actuator rod 68. The top end of said rod extends upwardly a short distance beyond the ball handle 65 where it is provided with a button 70, and a spring 71 surrounds said rod between said button and the bottom end of a recess 72, formed in said ball handle. This spring normally urges the rod 68 upwardly and when the parts are in their normal position, the finger 67 on the sleeve 66 of the lever 61 is held in engagement within the deeper notch 56 in the bridge bar 55.

When the parts are in the position shown in Figs. 1 and 3, wherein the gear 11 of the transmission is out of engagement with respect to both gears 9 and 10 of the jack shaft, the various parts are in neutral so far as the first speed forward and reverse shift rod or rail 14 is concerned. However, it is pointed out that said gear and said parts may occupy the same position when the lever 15 of the transmission has been actuated to produce second or third speed forward. For the purpose of description, let it be assumed that all parts of the transmission are in neutral as when the automobile is not in operation but is parked or stopped with its engine running. Under such a condition, the jack shaft gears 9 and 10 are rotating but the shaft 6 is non-rotative because of the fact that neither of said gears is engaged by the gear 11.

In the shift of the lever 15 to provide first speed, the shift rail or rod 14 is moved forwardly and this through the yoke 17 shifts the gear 11 on the shaft 6 into engagement with the gear 9 so that the shaft 6 is now being driven forward to provide first (or low) speed forward. In this movement of the shift rod or rail forwardly with the trigger end 51 extending down through the opening 45 in the yoke body 43 and into the notch 19 of the shift rail 14, the yoke is locked to said rail. Thus in the forward movement of said rail, the yoke body 43 moves with said rail and because of its arms 42, the collar 38 moves with the yoke body so that the teeth 39 and 40 of said collar engage with the teeth 27 and 31 of the two clutch members 25 and 30 and lock them together independently of the clutching spring. Such engagement between said members and collar is best shown in Fig. 4. Therefore, the drive is from the shaft 6 through the locked together clutch members 25 and 30 to the shaft 29 which as before stated is operatively connected to the propeller shaft. In the manner described first speed forward without free wheeling is attained.

From the above, it is apparent that in going into first speed forward, free wheeling is automatically locked-out and this is an advantageous feature because it safeguards against or prevents the automobile from being unconsciously or otherwise driven in this first speed with free wheeling action and thus a smaller unit may be used than would be required in one for transmitting low gear torque under free wheeling conditions.

Before shifting into second and then third speeds forward, it is apparent that the rod 14 is first brought back to neutral wherein the parts are again in the position shown in Fig. 3. Now let it be assumed that the shaft 6 is being driven in third speed which is direct engine speed. Thus the drive will be from said shaft to the cup member 25 which because of its difference in relative rotation speed with respect to the clutch member 30, acts to unwind and radially expand the spring 34. This as before described grips against the internal surface of the pocket 35 and clutches said two clutch members together. This action is permissible because at this time the teeth 40 of the collar 38 are disposed in the space between the spline teeth 31 and 32 of the clutch member 30.

Should the engine be decelerated at this time or should the car be descending a grade whereby the shaft 29 and clutch member 30 are being driven by momentum at a speed faster than that of the clutch member 25, then due to the clutch spring being anchored at one end to the clutch member 30, said spring is wound up and radially reduced in diameter so that it releases its gripping action on the surface of the pocket 33 whereby said clutch members are declutched from each other. Thus the clutch member 30 can now overrun the clutch member 25.

For the purpose of description, again assume that the parts are in their neutral position as shown in Fig. 3 and it is desired to go into reverse. By means of the shift lever 15, the rod 14 is moved rearwardly and this will bring the gear 11 into mesh with the idler gear of the transmission which as before described is in mesh with the gear 10 on the jack shaft. In this rearward movement of said shift rod, the yoke body 43 still being locked to the shift rod because of the engagement of the trigger part 51 in the notch 19 of said rod, will move rearwardly therewith. In this movement of the yoke, the collar 38 moves therewith and this will cause the teeth 40 of said collar to engage the teeth 32 at the rear end of the clutch member 30. As the teeth 39 of said collar still engage the teeth 27 of the clutch member 25, said collar merely bridges the teeth 31 of the clutch member 30 so as to lock said clutch members 25 and 30 together. Thus with the shaft 6 rotating in a reverse direction and with the clutch member positively connecting the clutch members 25 and 30 together the shaft 29 is driven in reverse with the clutch spring locked-out of action. When shifting out of reverse, back into neutral, the shift rod 14 moves forwardly and imparts a like movement to the collar and this reestablishes the free wheeling action wherein the clutch members are relatively rotatable in one direction.

It may be advisable at some time or other when driving in second or third speed forward to lock-out the free wheeling action of the clutch, as for instance when descending long steep grades and it is desired to use the engine as a brake in holdidng back car momentum. Therefore, assume that the car is being driven in second speed forward and it is desired to lock-out the free wheeling action. It is of course, obvious that when in such second speed forward, the shift rail 14 is still in the neutral position because the relative movements of the shift rails are independent and that when one is being actuated to produce the corresponding speeds, the other is in neutral and vice versa.

Thus when in second or third speed forward and it is desired to lock-out the free wheeling action, the ball handle 65 is grasped by the hand and at the same time the button 70 is pushed downwardly. This compresses the spring 71 and at the same time depresses the rod 68 so that the sleeve 66 on the bottom end thereof moves downwardly on the tube 60 and withdraws the finger or lug 67 from the notch 56 in the bridge bar 55. In the downward movement of the sleeve 66, as said lug leaves its notch 56, it enters the space 47 on the yoke body 43 between the ears 44 and studs 46 and engages the horizontal arm 50 of the trigger 49. This throws said arm 50 downwardly and compresses the spring 52 and at the same time lifts the vertical end 51 of said trigger 49 out of the notch 19 in the shift rail 14. In this manner, the yoke is unlocked and released from the shift rail 14 and as the top end of the lever is swung rearwardly, the bottom end thereof is swung forwardly. As the finger 67 is still disposed in the space 47, the yoke shifts longitudinally on the shift rod 14 and this moves the collar 38 forwardly when the finger 67 will enter the notch 57 in the bridge bar and will lock therein so soon as pressure on the button 70 is released. With the collar in its forwardly shifted position, the teeth 39 and 40 thereof will engage the teeth 27 and 31 of the clutch members 25 and 30 and will lock them together. It is pointed out at this time, that the finger 67 is holding the trigger in such a position that the vertical part 51 thereof is held with its extremity above the rail or rod 14 so that it cannot engage therewith. Thus in second or third speed forward the free wheeling action can be locked-out and when it is desired to restore such action, it is only necessary to again depress the button 70 and swing the lever 61 forwardly. This releases the lug 67 from the notch 57 and unlocks the lever and in its swinging movement said lug will immediately snap into the notch 56 of the bridge bar.

Of course, in this movement of the lever 61 the yoke body 43 will be shifted rearwardly on the rail 14 so that when the lug 67 snaps back into the recess 56, the trigger 49 is released and its end 51 again locks the body of the yoke to said shift rod.

Assume now that after a run in third speed forward, with the free wheeling action locked-out as before described, the car is stopped and the shift rail 13 is returned to neutral. Assume also that the operator has forgotten or for some other reason has not released the lock-out control collar 38. When the car is to be again started, the shift rail 14 is moved to provide first speed forward but as the two clutch members are still locked together, the car will be started without any free wheeling action in first speed forward, and this will bring the collar 18 on the rod 14 up against the rear end of the yoke body 43.

When in first speed forward, should the operator for any reason decide to shift the collar 38 into free wheeling position, his first manipulation is to shift the lever 61. In this movement, however, the button 70 is first depressed to release the finger 67 from the notch 57 in the bridge bar after which the top end of the lever 61 is swung forwardly which swings the bottom end of said lever rearwardly. At this time the finger 67 is still disposed in the space 47 in the yoke body and holds the lever end out of the notch 19 in the shift rod 18 and as the rear end of said lever 61 swings forwardly the yoke body must move therewith. As the collar 18 on the shift rod 14 is still in engagement with the rear end of the yoke body, not only the yoke and collar 38 is moved rearwardly but also the shift rod 14 so that instead of going into free wheeling in first speed forward, all parts are returned to neutral. Also, in this movement in trying to provide first speed forward in free wheeling, the finger 67 enters the notch 56 in the bridge bar and the spring 52 immediately acts upon the lever 49 to lock the yoke to the shift rod 14.

Thus while the free wheeling action is locked-out automatically when going into reverse and while free wheeling is available in second and third speeds forward, at no time can such free wheling action be had in first speed forward either when initially shifted thereinto or when in such speed and the lock-out control collar lever is actuated in an attempt to provide free wheeling in said first speed forward.

With such a structure while free wheeling action may be had in all speeds of the transmission, excepting first speed forward, and reverse, said structure safeguards the free wheeling unit from being used as a driving connection in said first speed forward. This permits the use of a smaller free wheeling unit than would be required for transmitting first speed forward or low gear torque.

While in describing the invention, I have referred in detail to the form, arrangement and construction of the several parts thereof, the same is to be considered merely as illustrative, so that I do not wish to be limited thereto except as may be specifically set forth in the appended claims.

I claim as my invention:—

1. In combination with a change speed transmission including shift rails for producing a plurality of forward speeds and reverse for the driven shaft of the transmission, a secondary driven shaft, a free wheeling unit interposed between said shafts, lock-out means for said free wheeling unit, means operating automatically in shifting to first speed forward for the transmission for actuating said lock-out means into lock-out position and other means for actuating said lock-out means into lock-out position independent of said means operating automatically when shifting into said first speed forward.

2. In combination with a change speed transmission including shift rails for producing a plurality of forward speeds and reverse for the driven shaft of the transmission, a secondary driven shaft, a free wheeling unit interposed between said shafts, lock-out means for said free wheeling unit, means operating automatically in shifting into either first speed forward or into reverse for the transmission for actuating said lock-out means into lock-out position and other means for actuating said lock-out means into lock-out position independent of said means operating automatically when shifting into either first speed forward or into reverse.

3. In combination with a change speed transmission including shift rails for producing first, second, and third speeds forward and reverse for the driven shaft of the transmission, a secondary driven shaft, a free wheeling unit interposed between said shafts, lock out means for said free wheeling unit, means operating automatically in shifting to first speed forward for the transmission for actuating said lock-out means into lock-out position, and other means for actuating said lock-out means to lock-out position in either the second or the third speed forward, said other means being independent of said means for actuating the lock-out means when shifting into said first speed forward.

4. In combination with a change speed transmission including shift rails for producing a plurality of forward speeds and reverse for the driven shaft of the transmission a secondary driven shaft, a free wheeling unit interposed between said shafts, means for controlling said unit to lock it in or out of operation in all forward speeds except one and means associated with that shift rail providing reverse for automatically locking out said unit in the movement of said rail to provide reverse.

5. In combination with a change speed transmission including shift rails for producing a plurality of forward speeds and reverse for the driven shaft of the transmission, a secondary driven shaft, coacting clutch members on said shafts, means associated with said clutch members for clutching them together in a relative rotation of said clutch members in one direction, a device associated with said clutch members and movable with respect thereto for locking them together independent of said last mentioned means, means operating automatically in the movement of one of said shift rails either into reverse or into first speed forward for moving said device and causing it to lock said clutch members together and other means operable after the movement of the other shift rail has been made to provide a certain other forward speed for the transmission for moving said device independent of said automatically operating means.

6. In combination with a change speed transmission including shift rails for producing a plurality of forward speeds and reverse for the driven shaft of the transmission, a free wheeling unit at the power take off end of said shaft and including a secondary shaft, lock-out means for said unit, means operable in the movement of one of said rails when producing either first speed forward or reverse for said driven shaft of the transmission for automatically actuating said lock-out means to lock-out position and other means operable independent of said last mentioned means for actuating said lock-out means into or out of lock-out position in other of the forward speeds of the transmission shaft.

7. In combination with a change speed transmission including shift rails for producing a plurality of forward speeds and reverse for the driven shaft of the transmission, a secondary driven shaft, coacting clutch members on said shafts, means associated with said clutch members and operable in a relative rotation between said clutch members in one direction for clutching them together, a member movable with respect to said clutch members for locking them together independent of said means associated with said clutch members, means for locking said member to one of said shift rails so that said member moves with said shift rail and means for releasing said member from said shift rail and for moving it independently of said shift rail.

8. In combination with a change speed transmission including shift rails for producing a plurality of forward speeds and reverse for the driven shaft of the transmission, a secondary driven shaft, oppositely facing cup like members on said shafts providing a clutch spring engaging surface, a clutch spring disposed in said members and operable in a relative movement in one direction between said cup like members for clutching them together, a shift collar associated with said clutch members for locking them together independent of said clutch spring, means for locking said collar to one of said shift rails so as to move therewith and means for releasing said collar from the said shift rail and for moving the same independently of said shift rail.

9. In combination with a change speed transmission including shift rails for producing a plurality of forward speeds and reverse for the driven shaft of the transmission, a secondary driven shaft, oppositely facing cup like members on said shafts providing a clutch spring engaging surface, a clutch spring disposed in said members and operable in a relative movement in one direction between said cup like members for clutching them together, a shift collar associated with said clutch members for locking them together independent of said clutch spring, means for locking said collar to one of said shift rails so as to move therewith and including a releasable locking latch movable with said collar and means for releasing said latch and which means is also usable for shifting the collar independent of said shift rail.

10. In combination with a change speed transmission including shift rails for producing a plurality of forward speeds and reverse for the driven shaft of the transmission, a secondary driven shaft, coacting clutch members on said shafts, means associated with said clutch members and operable in a relative rotation between said clutch members in one direction for clutching them together, a collar shiftable with respect to said clutch members for locking them together independent of said last mentioned means, a shifter yoke engaged with said collar, releasable means for locking said yoke to one of said shift rails, and means for releasing said yoke from said rail and for moving it independently of the shift rail and longitudinally thereon.

11. In combination with a change speed transmission including shift rails for producing a plurality of forward speeds and reverse for the driven shaft of the transmission, a secondary driven shaft, coacting clutch members on said shafts, means associated with said clutch members and operable in a relative rotation therebetween in one direction for clutching them together, a collar shiftable with respect to said clutch members for locking them together independent of said last mentioned means, a shifter yoke engaged with said collar, and a shiftable lever including a part operable to release the yoke from the shift rail and which lever is operable in its shifting movement for imparting a like movement to said yoke independent of and upon said shift rail.

12. In a mechanism of the kind described, a longitudinally shiftable rail, a driven shaft, a secondary driven shaft, clutch members on said shafts, means associated with said clutch members for clutching them together in a relative rotation of said shafts in one direction, a collar surrounding said clutch members and operable when shifted longitudinally in one direction from a neutral position to lock said clutch members together independent of said means associated with the clutch members, a yoke mounted on the shift rod and engaged with said collar, releasable means carried by said yoke for locking it to said shift rail and means for releasing said yoke from the shift rail and for moving it longitudinally thereupon.

13. In a mechanism of the kind described, a longitudinally shiftable rail, a driven shaft, a secondary driven shaft, clutch members on said shafts, means associated with said clutch members for clutching them together in a relative rotation of said shafts in one direction, a collar surrounding said clutch members and operable when shifted longitudinally in one direction from a neutral position to lock said clutch members together independent of said means associated with the clutch members, a yoke mounted on the shift rod and engaged with said collar, releasable means carried by said collar, a spring pressed latch carried by the yoke for releasably locking said yoke to the shift rail, and means for engaging the latch to release the same and which means is also operable for moving the yoke when released, longitudinally upon said shift rail.

14. In a mechanism of the kind described, a longitudinally shift rail, a driven shaft, a secondary driven shaft, oppositely facing clutch members on said shaft, one of said clutch members having external spline teeth thereon and the other clutch member having two sets of longitudinally spaced, external spline teeth thereon, means within the clutch members and operating automatically in a relative rotation in one direction to clutch them together, a collar surrounding said clutch members and having internal clutch teeth which when the collar is shifted longitudinally in either direction from a neutral position locks said clutch members together independently of said means within said clutch members, a yoke connected to said collar, means for releasably locking the yoke to the shift rod and means operable to engage said last mentioned means to release the yoke from the shift rail and for moving it longitudinally thereon.

15. In combination with a change speed transmission including a main driven shaft, a secondary driven shaft, gearing and an associated rail shiftable from a neutral position to provide either a forward or a reverse drive for said main driven shaft, a free wheeling mechanism between said shafts and comprising clutch members, one fixed to each shaft and an associated means operating to clutch said members together in a relative rotation in one direction and shiftable means for locking said clutch members together independent of said clutching means, said rail when shifted from said neutral position to provide said reverse drive, operating upon said shiftable means to lock said members together independent of said clutching means and automatically to lock out the free wheeling action of said mechanism and also operating when shifted back to neutral position to actuate said shiftable means to unlock said clutch members to again reestablish said action.

CLARENCE H. BARTON.